United States Patent
Mays, Jr.

(10) Patent No.: US 6,452,700 B1
(45) Date of Patent: Sep. 17, 2002

(54) COMPUTER BACKPLANE EMPLOYING FREE SPACE OPTICAL INTERCONNECT

(75) Inventor: Robert Mays, Jr., Austin, TX (US)

(73) Assignee: R&DM Foundation, Austin, TX (US)

( * ) Notice: Subject to any disclaimer, the term of this patent is extended or adjusted under 35 U.S.C. 154(b) by 0 days.

(21) Appl. No.: 09/884,459

(22) Filed: Jun. 19, 2001

Related U.S. Application Data (60) Provisional application No. 60/261,042, filed on Jan. 11, 2001.

(51) Int. Cl.[7] .................................................. G02B 5/32
(52) U.S. Cl. ............................ 359/15; 359/19; 359/163
(58) Field of Search ............................. 359/1, 15, 19, 359/8, 9, 569, 570, 14, 193, 163, 127, 130, 131; 250/237 R, 237 G, 550

(56) References Cited

U.S. PATENT DOCUMENTS

| | | |
|---|---|---|
| 3,751,132 A | 8/1973 | Croh |
| 3,785,736 A * | 1/1974 | Spitz et al. .................... 356/71 |
| 4,057,319 A | 11/1977 | Ash et al. |
| 4,710,605 A | 12/1987 | Presby |
| 4,817,207 A | 3/1989 | Smith et al. |
| 4,932,989 A | 6/1990 | Presby |
| 4,953,954 A | 9/1990 | Ewbank et al. |
| 5,011,254 A | 4/1991 | Edwards et al. |
| 5,140,657 A | 8/1992 | Thylen |
| 5,204,866 A * | 4/1993 | Block et al. ................. 359/152 |
| 5,256,851 A | 10/1993 | Presby |
| 5,446,572 A | 8/1995 | Husbands et al. |
| 5,446,816 A | 8/1995 | Shiraishi et al. |
| 5,515,194 A | 5/1996 | Kanterakis et al. |
| 5,521,913 A | 5/1996 | Gridley |
| 5,581,405 A * | 12/1996 | Meyers et al. ............... 359/569 |
| 5,677,778 A | 10/1997 | Kanterakis |

(List continued on next page.)

FOREIGN PATENT DOCUMENTS

| | | |
|---|---|---|
| WO | WO99/59766 | 11/1999 |
| WO | WO99/60192 | 11/1999 |
| WO | WO00/02700 | 1/2000 |
| WO | WO00/04660 | 1/2000 |
| WO | WO00/05026 | 2/2000 |
| WO | WO00/32327 | 6/2000 |
| WO | WO00/28359 | 10/2000 |

OTHER PUBLICATIONS

L. Laycock, S. Robertson, P. Cawte, M. Bains, "Optical Backplanes", PCT WO 94/18587, Published Aug. 18, 1994.*

U.S. patent application Ser. No. 09/648,847, filed Aug. 25, 2000, Mays.

U.S. patent application Ser. No. 09/851,857, filed May 9, 2001, Mays.

U.S. patent application Ser. No. 09/884,424, filed Jun. 19, 2001, Mays.

U.S. patent application Ser. No. 09/884,562, filed Jun. 19, 2001, Mays.

*Primary Examiner*—Cassandra Spyrou
*Assistant Examiner*—Arnel C. Lavarias
(74) *Attorney, Agent, or Firm*—Kenneth C. Brooks (57) ABSTRACT

Provided is an optical backplane interconnect system, one embodiment of which features transceiver subsystems employing holographic optical elements (HOEs) that define, and discriminate between, differing optical channels of communication. The HOEs employ a holograph transform to concurrently refract and filter optical energy to remove optical energy having unwanted characteristics. To that end, the transceiver subsystem is mounted to an expansion card and includes a source of optical energy and an optical detector. The HOE need not be mounted to the expansion card. In one embodiment, however, the HOE is mounted to the expansion card and in optical communication with either the source of optical energy, the optical detector or both.

20 Claims, 7 Drawing Sheets

U.S. PATENT DOCUMENTS

| | | |
|---|---|---|
| 5,699,464 A | 12/1997 | Marcuse et al. |
| 5,772,720 A | 6/1998 | Taira-Griffin et al. |
| 5,793,919 A | 8/1998 | Payne et al. |
| 5,809,198 A | 9/1998 | Weber et al. |
| 5,818,618 A * | 10/1998 | Eastmond .................. 359/127 |
| 5,832,147 A | 11/1998 | Yeh et al. |
| 5,915,097 A | 6/1999 | Chao |
| 5,935,288 A | 8/1999 | DiGiovanni et al. |
| 5,943,149 A | 8/1999 | Cearns et al. |
| 6,055,099 A | 4/2000 | Webb |
| 6,072,579 A | 6/2000 | Funato |
| 6,081,430 A | 6/2000 | LaRue |
| 6,144,472 A | 11/2000 | Knox |
| 6,151,144 A | 11/2000 | Knox |
| 6,185,215 B1 | 2/2001 | Aho |
| 6,246,026 B1 | 6/2001 | Vergeest |
| 6,246,680 B1 | 6/2001 | Muller et al. |
| 6,314,210 B1 | 11/2001 | Fukushima et al. |
| 2002/0001108 A1 * | 1/2002 | Yeo .............................. 359/8 |

* cited by examiner

COMPUTER BACKPLANE EMPLOYING FREE SPACE OPTICAL INTERCONNECT

CROSS-REFERENCE TO RELATED PATENT APPLICATION

The present patent, application claims priority from U.S. Provisional patent application No. 60/261,042 filed Jan. 11, 2001 entitled COMPUTER BACKPLANE EMPLOYING FREE SPACE OPTICAL INTERCONNECT and listing Robert Mays, Jr. as inventor, which is incorporated herein in its entirety.

BACKGROUND OF THE INVENTION

The present invention relates to an optical free space interconnect of circuitry. Particularly, the present invention concerns optical interconnection employed in computers.

Expansion slots greatly increase operational characteristics of personal computers (PCs). The expansion slots are connected to various PC circuitry, such as a microprocessor, through a bus and allow the PC to communicate with peripheral devices, such as modems, digital cameras, tape drives and the like. To that end, electrical interface circuitry, referred to as adapters or expansion cards, are inserted in the expansion slots to facilitate communication between the PC circuitry and the peripheral devices. The combination of expansion slots, expansion cards and bus system is commonly referred to as a backplane interconnect system. The bus system associated with the backplane interconnect system connects power, data and control lines to the expansion cards and facilitates communication between the expansion cards and other PC circuitry. The bus system cooperates with a protocol to, among other things, prevent two or more expansions cards from concurrently communicating on a common bus line.

Figure 1:
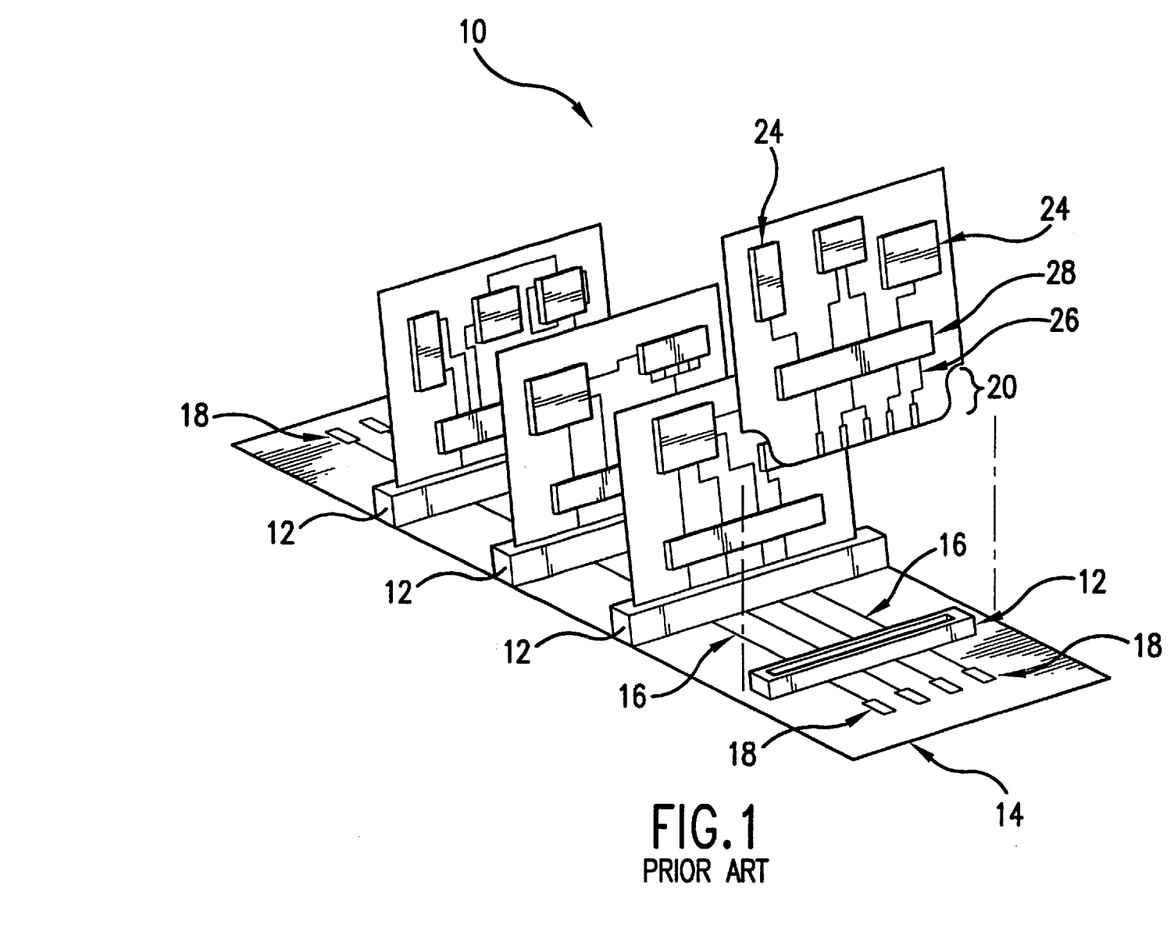
FIG. 1 is a perspective view of a backplane interconnect system in accordance with the prior art.

Referring to FIG. 1, an example of a prior art backplane interconnect system 10 includes expansion slots 12 mounted on a motherboard 14. The expansion slots 12 are wired together with one or more busses 16 disposed on the motherboard 14. Each bus 16 normally has multiple lines with terminations 18 at opposing ends of each line. The expansion card 22 has a mating connector 20 that is adapted to be received into the expansion slot 12. Each expansion card 22 may contain numerous circuits and components 24 to perform desired functions. The circuits and components 24 are in electrical communication with conductive traces 26 on the mating connector 20 through bus transceivers 28. Bus transceivers 28 facilitate communication between components 24 of the various expansion cards 22 in backplane interconnect system 10 by driving and detecting signals on the bus lines 16.

As the operational speed of PCs increases, the need to increase the data transfer rate over the backplane interconnect system becomes manifest. Conventionally, increases in data transfer rate have been achieved by either increasing the operational frequency of the individual expansion boards or by increasing the number of lines associated with a bus. Increases in data transfer rates of backplane interconnect systems have been inhibited by crosstalk, noise, degradation in signal integrity and the operational limitations of connectors. One attempt to increase the data transfer rates of a backplane interconnect system has been directed to controlling the impedance associated with the bus lines, as discussed in U.S. Pat. No. 6,081,430 to La Rue. However, it has been recognized that optical backplanes have been successful in increasing the data transfer rates of backplane interconnect systems.

U.S. Pat. No. 6,055,099 to Webb discloses an optical backplane having an array of lasers in optical communication with a lens relay system. The lens relay includes a series of coaxially aligned lenses. The lenses are spaced apart along a planar substrate and form repeated images of an optical array at the input to an interconnect. Output ports are located at different points along the interconnect. Each pair of lenses encloses one of the repeated images and is formed as a single physically integral member. The integral member may take the form of a transparent rod having spherical end surfaces. Each of the spherical end surfaces then provided one of the pair of lenses.

U.S. Pat. No. 5,832,147 to Yeh et al. discloses an optical backplane interconnect system employing holographic optical elements (HOEs). The backplane interconnect system facilitates communication with a plurality of circuit boards (CBs) and a plurality of integrated circuit chips. Each CB has at least an optically transparent substrate (OTS) mate parallel to the CB and extending outside a CB holder. On another OTS mate, two HOEs are utilized to receive and direct, at least part of, a light beam received to a detector on a corresponding CB via free space within the circuit board holder or reflection within the OTS mate. A drawback with the prior art optical backplane interconnect system is that the number of optical channels that may be provided is limited due to the difficulty in achieving discrimination between optical free space signals.

What is needed, therefore, is an optical backplane interconnect system that increases the number of optical channels while avoiding crosstalk in optical signals propagating along the optical channels.

SUMMARY OF THE INVENTION

Provided is an optical backplane interconnect system, one embodiment of which features transceiver subsystems employing holographic optical elements (HOEs) that define, and discriminate between, differing optical channels of communication. The HOEs employ a holograph transform to concurrently refract and filter optical energy having unwanted characteristics. To that end, the transceiver subsystem is mounted to an expansion card and includes a source of optical energy and an optical detector. The HOE need not be mounted to the expansion card. In one embodiment, however, the HOE is mounted to the expansion card and in optical communication with either the source of optical energy, the optical detector or both.

The expansion card is in optical communication with an additional expansion card associated with the interconnect system that also includes the transceiver subsystem and HOE discussed above. The source of optical energy is positioned so that the optical detector associated with the additional expansion card senses the optical energy produced by the source, defining a first source/detector pair. A first HOE is disposed between the source and the detector of the first source/detector pair. A second HOE is disposed between a second source/detector pair that includes the optical detector of the expansion card positioned to sense optical energy produced by the optical source of the additional expansion card. The first and second HOEs are formed to limit the optical energy passing therethrough, attenuating all optical energy that impinges thereupon and having unwanted characteristics. In this example, optical energy of the type that is attenuated by the first HOE may propagate through the second HOE, and optical energy of the type attenuated by the second HOE may propagate through the first HOE. In this manner, the first and second HOEs may define differing optical channels by selectively allowing optical energy to pass therethrough. To that end, the first HOE is placed in close proximity with the optical detector of the additional expansion card, and the second HOE is placed in close proximity to the optical detector of the expansion card. Each of the two aforementioned optical detectors would sense only optical energy having desired characteristics. Hence, two discrete optical channels are defined, each of which may be in communication with one or both of the two sources of optical energy.

In another exemplary embodiment, each of the aforementioned optical channels may be uniquely associated with one of the optical detectors and one of the sources of optical energy. To that end, two or more pairs of HOEs are employed. Each HOE of one of the two pairs is associated with a source/detector pair and has holographic transforms that is substantially similar, if not identical, to the holographic transform associated with the remaining HOE of the pair. However, the holographic transform associated with one of the pairs of HOEs differs from the holographic transform associated with the remaining pair of HOEs. In this manner, two optical channels may be defined with crosstalk between the channels being substantially reduced, if not eliminated. With this configuration, the number of optical channels may be increased so that hundreds of optical channels may facilitate communication between two expansion cards, with some of the optical channels being redundant to increase the operational life of the optical backplane interconnect system. These and other embodiments are described more fully below.

DETAILED DESCRIPTION OF THE INVENTION

Figure 2:
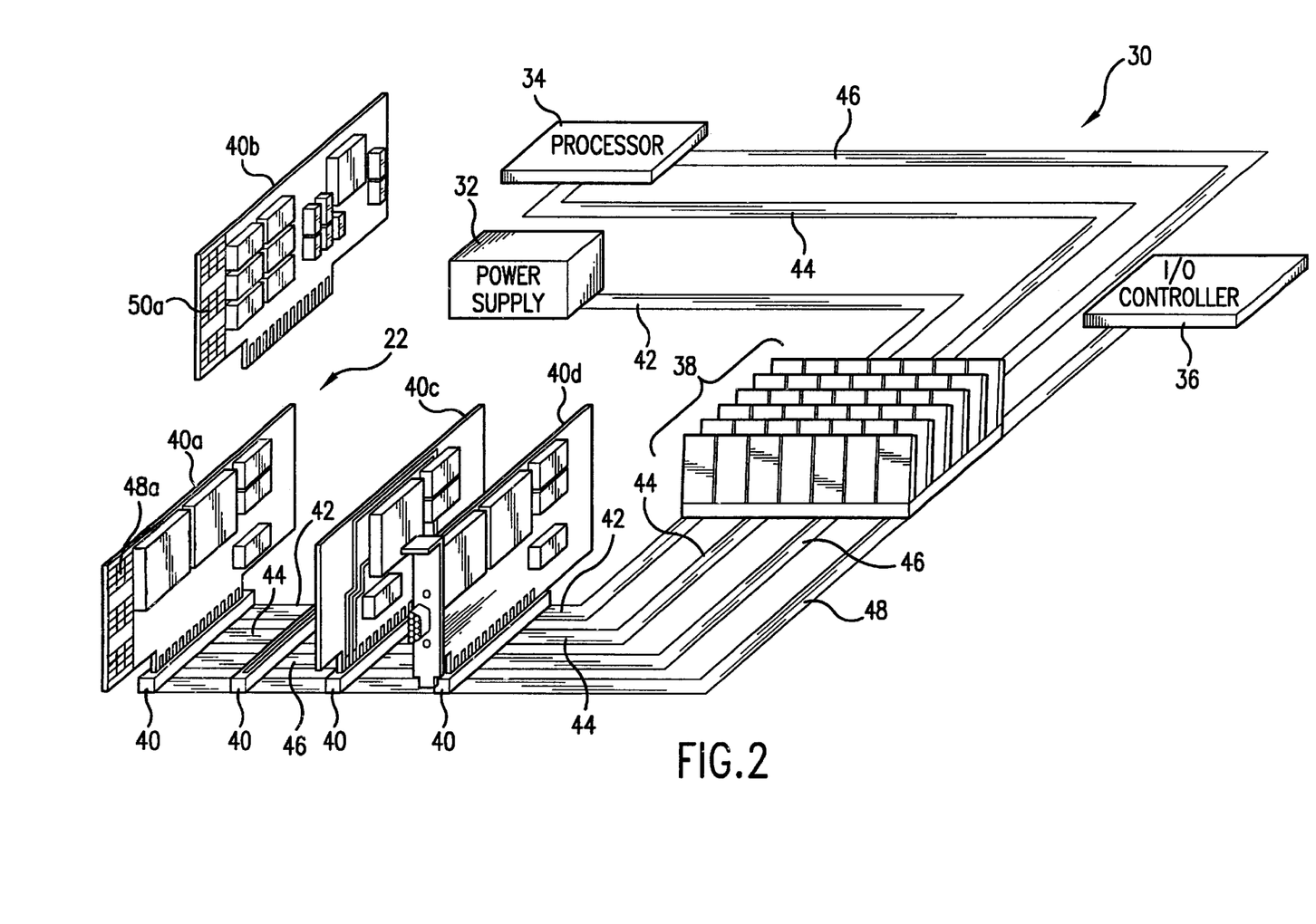
FIG. 2 is a simplified plan view of a computer system employing an optical backplane interconnect system in accordance with the present invention.

Referring to FIG. 2, shown is an exemplary computer system 30, such as a personal computer that includes a power supply 32, a processor 34, input/output device controller and associated memory (I/O controller) 36, main memory 38, expansion slots 40 and expansion cards 40a, 40b, 40c and 40d. The expansion slots 40 are in electrical communication with the power supply 32 over a power bus 42. The power bus 42 includes multiple lines, each of which is dedicated to carrying a single voltage level. A main system data bus 44 is in data communication with processor 34, expansion slots 40 and main memory 38. Main data bus 44 includes eight to sixty-four different lines, depending upon the data transfer protocol supported by the system 30, e.g., ISA, EISA, or MCA protocols and the like. Main data bus 44 carries data transferred between processor 34, main memory 38 and expansion slots 40. An address bus 46 comprising, for example, twenty lines is in data communication with main memory 38, processor 34 and expansion slots 40. Address bus 46 carries information that specifies the address from, or to, data that is to be moved. To facilitate data transfers, a control bus 48 is included that has a plurality of lines placing main memory 38 and expansion slots 40 in data communication with I/O controller 36.

Figure 3:
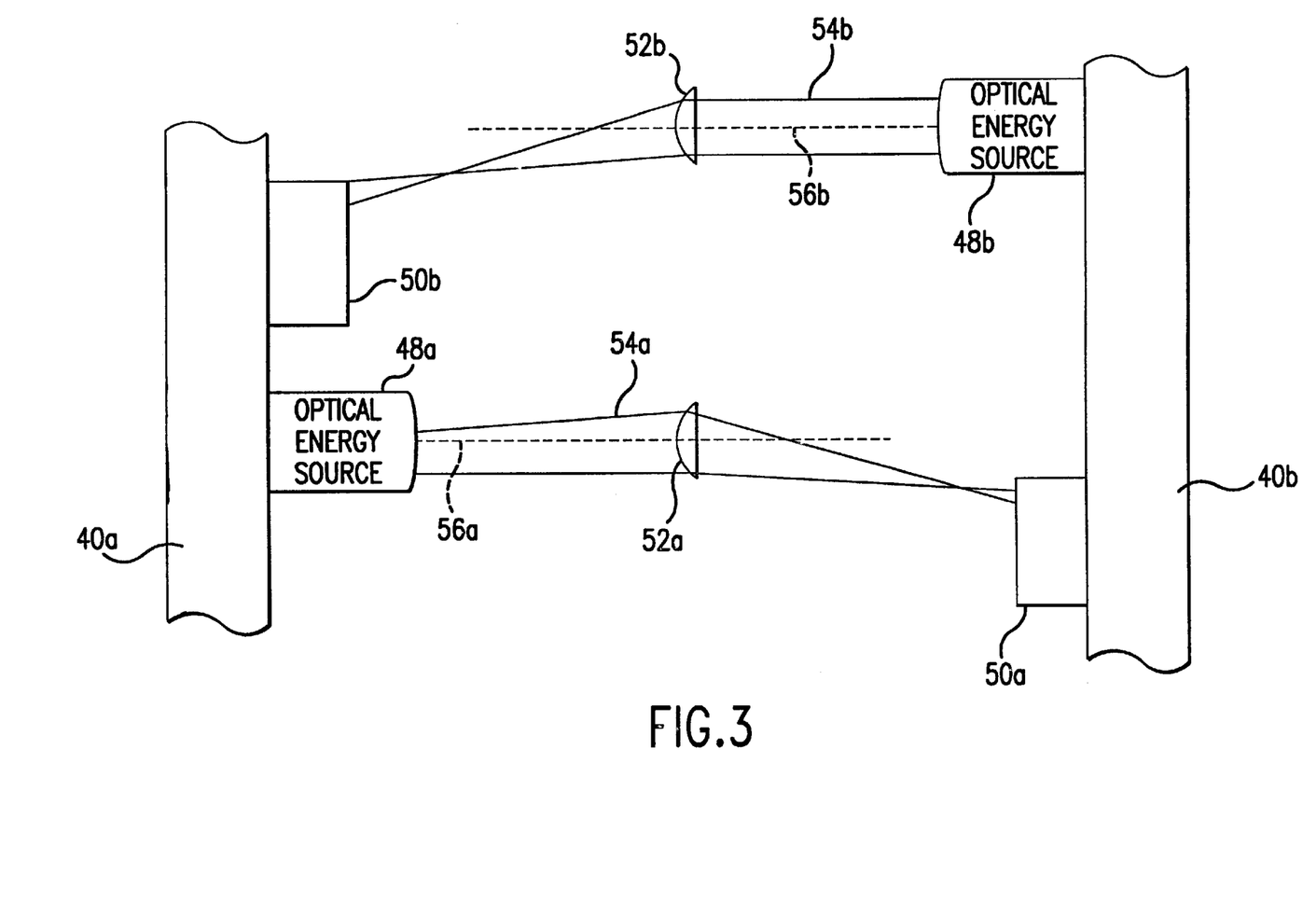
FIG. 3 is a simplified plan view of a source of optical energy mounted to a first expansion card and optical detector mounted to a second expansion card spaced apart from the first expansion card.

Referring to both FIGS. 2 and 3, as mentioned above, each of the expansion slots 40 is adapted to receive an expansion card 40a, 40b, 40c and 40d. One or more optical channels facilitate communication between two or more of the expansion cards 40a, 40b, 40c and 40d. One optical channel includes one or more sources of optical energy 48a mounted to expansion card 40a, and one or more optical detectors 50a mounted to expansion card 40b and in data communication with the source of optical energy 48a. A HOE 52a is disposed between the source of optical energy 48a and the detector 50a. A second optical channel includes one or more sources of optical energy 48b mounted to expansion card 40b, and one or more optical detectors 50b mounted to expansion card 40a and in data communication with the source of optical energy 48b. A HOE 52b is disposed between the source of optical energy 48b and the detector 50b.

Source of optical energy 48a directs optical energy 54a along a path 56a in which the detector 50a lies. The HOE 52a is disposed in the optical path 56a. Source of optical energy 48b directs optical energy 54b along a path 56b in which the detector 50b lies. The HOE 52b is disposed in the optical path 56b. Each of the HOEs 52a and 52b has both a refractory function and a holographic transform function enabling the HOEs 52a and 52b to concurrently filter and refract the optical energy propagating therethrough. In this manner, the HOEs 52a and 52b filter the optical energy 54a and 54b, respectively so that the optical energy passing therethrough to impinge upon the optical detectors 50a and 50b, respectively, have desired characteristics.

HOE 52a and 52b are identical in construction and, therefore, only HOE 52a will be discussed, but it should be borne in mind that the discussion with respect to HOE 52a applies with equal weight to HOE 52b. HOE 52a is a refractory lens having a bulk hologram recorded therein that defines a holographic transform function. The bulk hologram facilitates characterizing the optical energy 54a to have desired characteristics that may improve detection, by the optical detector 50a, of information contained in the optical energy 54a. For example, the transform function may allow a specific wavelength to pass through the lens, diffracting all other wavelengths to deflect away from the optical detector 50a. Alternatively, the transform function may allow only a certain polarization of the optical energy 54a to propagate therethrough, diffracting all other polarizations away from the optical detector 50a.

The refractory function of the HOE 52a facilitates impingement of the optical energy 54a onto the optical detector 50a. In this manner, the precise alignment of the optical detector 50a with respect to the source 48a and, therefore, the path 56a may be relaxed. This is beneficial when facilitating communication between expansion cards, such as 40a and 40b, because the mechanical coupling of the expansion cards 40a and 40b to the respective slots 40 would typically make difficult precisely aligning source 48a with the detector 50a.

Figure 4:
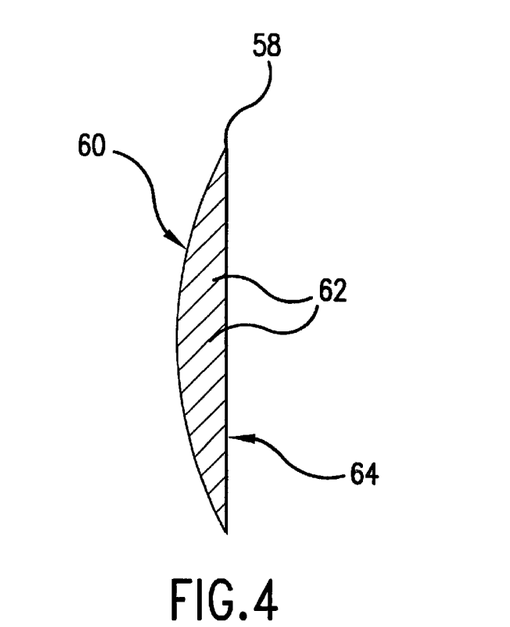
FIG. 4 is a cross-sectional view of a lens employed in the backplane interconnect system shown above in FIG. 2, in accordance with the present invention.

Referring to FIG. 4, the HOE 52a is a lens 58 having an arcuate surface 60, e.g., cylindrical, spherical and the like with a bulk holographic transform function formed therein. The bulk holographic transform function is shown graphically as periodic lines 62 for simplicity. The bulk holographic transform function 62 is recorded in substantially the entire volume of the lens 58 through which optical energy will propagate. The transform function 62 is a periodic arrangement of the space-charge field of the material from which the lens 58 is fabricated. To that end, the lens 58 may be formed from any suitable photo-responsive material, such as silver halide or other photopolymers. In this manner, the lens 58 and the bulk holographic transform function 62 are integrally formed in a manner described more fully below. Although the surface 64 of the lens 58 disposed opposite to the spherical arcuate surface 60 is shown as being planar, the surface 64 may also be arcuate as shown in surface 164 of lens 158 in FIG. 5.

Figure 5:
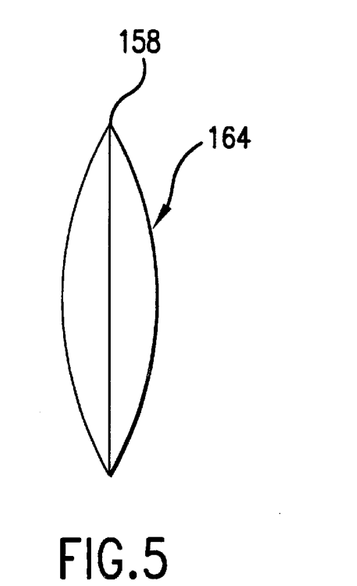
FIG. 5 is a cross-sectional view of the lens shown above in FIG. 4 in accordance with an alternate emb the present invention.
Figure 6:
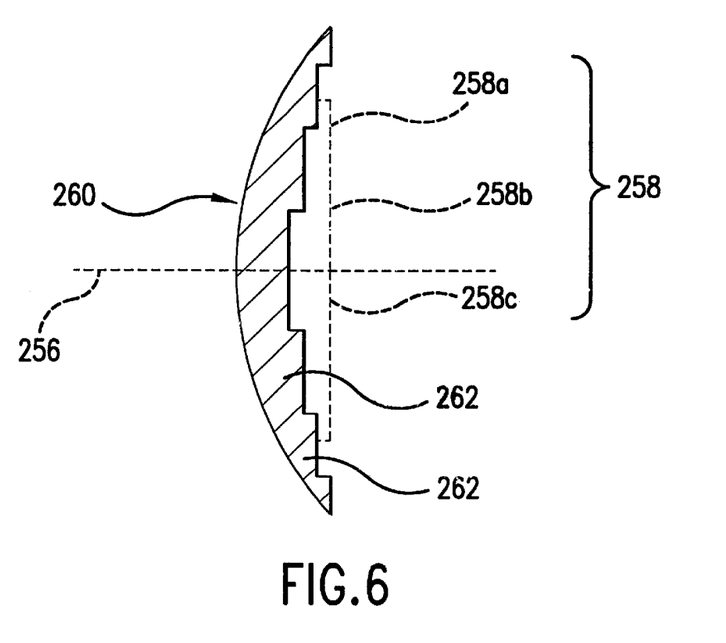
FIG. 6 is a cross-sectional view of the lens shown above in FIG. 4 in accordance with a second alternate embodiment of the present invention.

Referring to both FIGS. 4 and 5, were it desired to further control the shape of optical energy propagating through lens 58, a Fresnel lens 258 may be formed opposite to the spherical surface 260. To that end, the Fresnel lens 258 includes a plurality of concentric grooves, shown as recesses 258a, 258b and 258c that are radially symmetrically disposed about a common axis 256. Thus, the lens 258 may have three optical functions integrally formed in a common element, when providing the bulk holographic transform function 262 therein, which facilitates creation of well defined optical channels between expansion cards 40a and 40b shown in FIG. 3.

In FIG. 2, facilitating communication between expansion cards 40a and 40b over optical channels increase the bandwidth of the computer system 30's bus systems. Specifically, the transfer of power and data between the expansion cards 40a and 40b and the computer system 30 is bifurcated. The power to the expansion cards 40a and 40b is transferred over power bus 42 and the data transfer between two or more expansion cards may be achieved over one or more optical channels. To that end, the expansion cards 40a and 40b are made backwards compatible with existing technology. This is shown by the implementation of standard expansion cards 40c and 40d along with expansion cards 40a and 40b, as well as the compatibility of expansion cards 40a and 40b with standard expansion slots 40. The presence of the optical channels, however, reduces the need to transfer information between the expansion cards 40a and 40b over the main data bus 44, as well as the need to transfer information over the address bus 46 or the control bus 48, were appropriate control circuitry included on the expansion cards 40a and 40b. Thus, employing the optical channels as described above, the computer system 30 bus bandwidth may be increased.

Figure 7A:
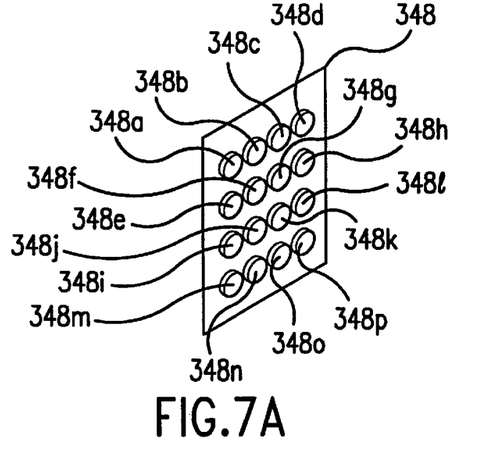
FIGS. 7A–7B are perspective views of an optical communication system employed in the backplane interconnect system shown above in FIG. 2, in accordance with an alternate embodiment.
Figure 7B:
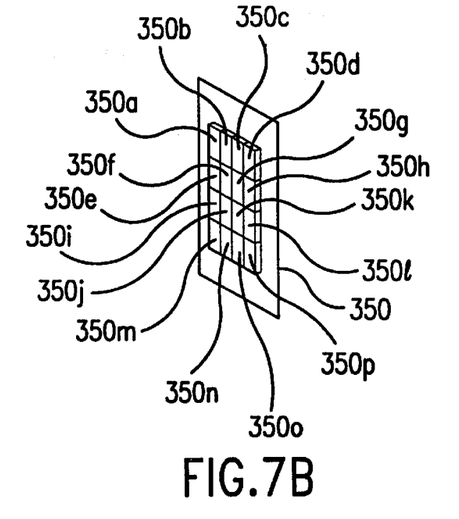
Figure 8:
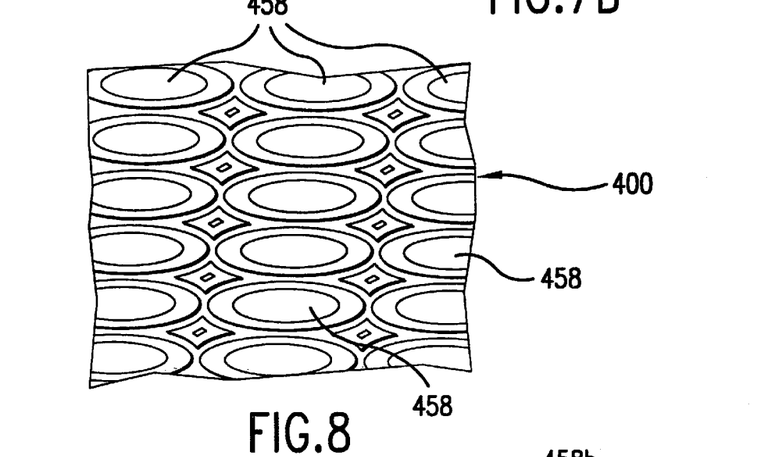
FIG. 8 is perspective view of an array of the lenses fabricated on a photo-sheet shown above in FIGS. 7A–7B.

Referring to FIGS. 2 and 7A–7B, as mentioned above the expansion cards 40a and 40b may each include multiple sources of optical energy 48a and multiple detectors 50a. To that end provided are an array of sources of optical energy 348, shown generally as optical emitters 348a–348p, and an array of optical detectors 350, shown generally as optical receivers 350a–350p. The optical emitters 348a–348p generate optical energy to propagate along a plurality of axes, and the optical receivers 350a–350p are positioned to sense optical energy propagating along one of the plurality of optical axes. Specifically, the array 348 is an (X×Y) array of semiconductor lasers that produce a beam that may be modulated to contain information. The array 350 may comprise of virtually any optical receiver known, such a charged coupled devices (CCD) or charge injection detectors (CID). In the present example, the array 350 comprises of CIDs arranged in an (M×N) array of discrete elements. The optical beam from the each of the individual emitters 348a–348p may expand to impinge upon each of the receivers 350a–350p of the array 350 if desired. Alternatively, the optical beam from each of the individual emitters 348a–348p may be focused to impinge upon any subportion of the receivers 350a–350p of the array 350. In this fashion, a beam sensed by one of the receivers 350a–350p of the array 350 may differ from the beam sensed upon the remaining receivers 350a–350p of the array 350. To control the wavefront of the optical energy produced by the emitters 348a–348p, the HOE 52a–52b, discussed above with respect to FIGS. 3–6 may be employed as an array of the lenses, shown more clearly in FIG. 8 as array 400.

Figure 9:
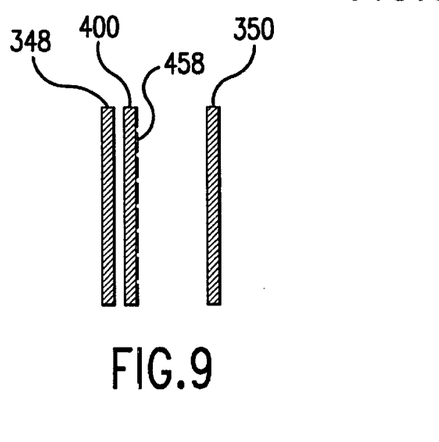
FIG. 9 is a cross-sectional plan view of the optical communication system shown above in FIGS. 7A–7B, in accordance with the present invention.

Specifically, referring to FIGS. 7A–7B and 9, the individual lenses 458 of the array are arranged to be at the same pitch and sizing of the array 348. The numerical aperture of each of the lenses 458 of the array 400 is of sufficient size to collect substantially all of the optical energy produced by the emitters 348a–348p corresponding thereto. In one example, the array 400 is attached to the array 348 with each lens resting adjacent to one of the emitters 348a–348p. To provide the necessary functions, each of the lenses of the array 400 may be fabricated to include the features mentioned above in FIGS. 4–6. As a result, each of the lenses 458 of the array 400 may be formed to have functional characteristics that differ from the remaining lenses 458 of the array 400. In this manner, each beam produced by the array 348 may be provided with a unique wavelength, polarization or both. This facilitates reducing cross-talk and improving signal-to-noise ratio in the optical communication system.

Figure 10:
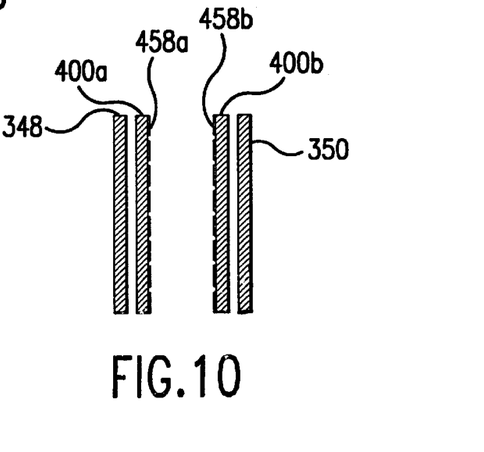
FIG. 10 is a cross-sectional plan view of the optical communication system shown above in FIG. 9, in accordance with an alternate embodiment of the present invention.

Specifically, an additional array of lenses 400b that match the pitch of the individual receivers 350a–350p of the array 350, is shown more clearly in FIG. 10. The lenses may be fabricated to provide the same features as discussed above with respect to array 400, shown in FIG. 8.

Referring to FIGS. 7A–7B, 8 and 10 each of the emitters 348a–348p of the array 348 would then be uniquely associated to communicate with only one of the receivers 350a–350p of the array 350. In this manner, the emitter 348a–348p of the array 348 that is in data communication with one of the receivers 350a–350p of the array 350 would differ from the emitters 348a–348p in data communication with remaining receivers 350a–350p of the array 350. This emitter/receiver pair that were in optical communication is achieved by having the properties of the lens 458a in array 400a match the properties of the lens 458b in array 400b. It should be understood, however that one of the emitters 348a–348p may be in data communication with any number of the receivers 350a–350p by multiple lenses 458b matching the properties of one of the lenses 458a. Similarly, one of the multiple emitters 348a–348p may be in optical communication with one or more of the receivers 350a–350p by appropriately matching the lenses 458a to the lenses 458b.

In one example, superior performance was found by having the array 350 sectioned into (m×n) bins, with each bin corresponding to a particular polarization and/or wavelength that matched a particular polarization and/or wavelength corresponding to a emitter 348a–348p. Thus, were a beam from one or more of the emitters 348a–348p to flood the entire (M×N) array 350 or multiple (m×n) bins, only the appropriate receivers 350a–350p sense information with a very high signal-to-noise ratio and discrimination capability. It will be noted that the (m×n) bins can also be effectively comprised of a single sensing pixel (element) to exactly match the (X×Y) array.

Additional beam-sensor discrimination may be achieved by employing emitters 348a–348p having different wavelengths or by incorporating up-conversion processes that include optical coatings applied to the individual emitters 348a–348p or made integral therewith. One such up-conversion process is described by F. E. Auzel in "Materials and Devices Using Double-Pumped Phosphors With Energy Transfer", Proc. of IEEE, vol. 61. no. 6, June 1973.

Figure 11:
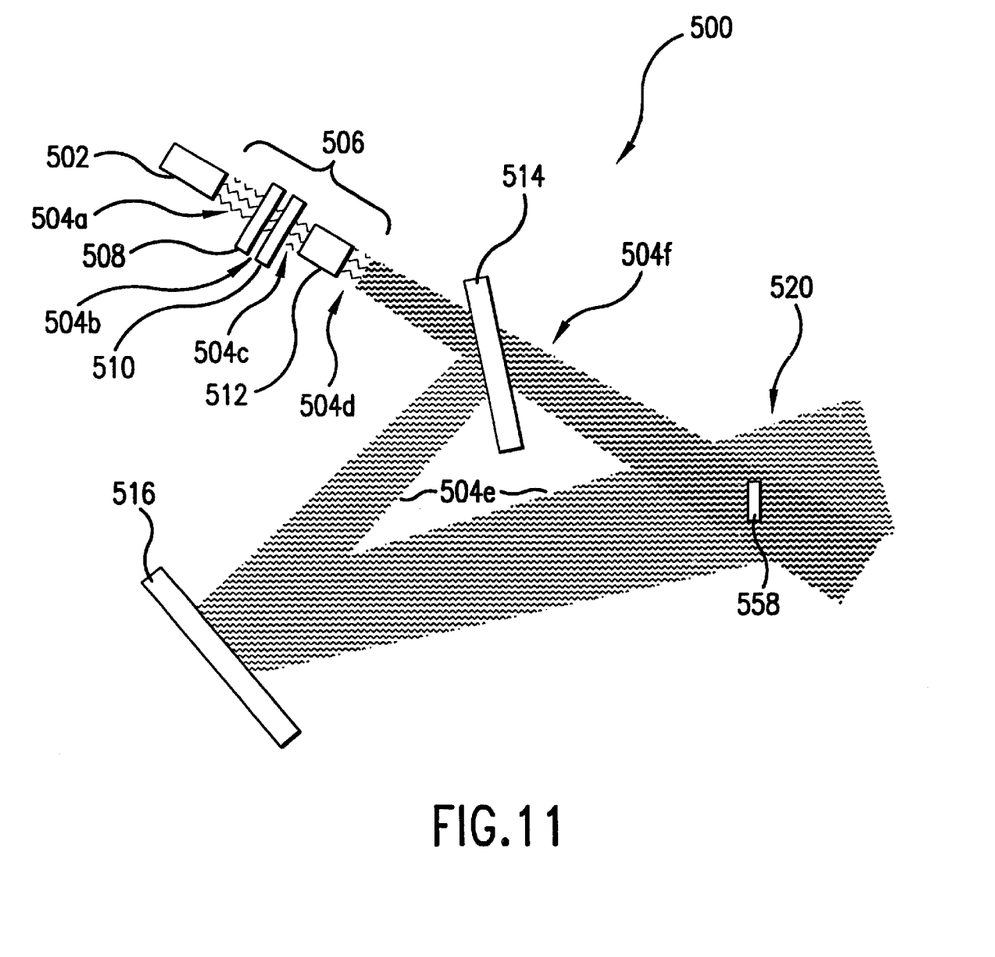
FIG. 11 is a simplified plan view showing an apparatus for fabricating the lenses shown above in FIGS. 4–6 and 8, in accordance with the present invention.

Referring to FIGS. 3, 10 and 11, the system 500 employed to fabricate the lens 58 and the lens arrays 400a and 400b includes a beam source 502 that directs a beam 504a into wave manipulation optics 506 such as a ¼ waveplate 508 so that the beam 504b is circularly polarized. The beam 504b impinges upon polarizer 510 so that the beam 504c propagating therethrough is linearly polarized. The beam 504c impinges upon a Faraday rotator 512 that changes birefringence properties to selectively filter unwanted polarizations from the beam 504c. In this manner, the beam 504 degressing from the rotator 512 is linearly polarized. The beam 504d impinges upon a beam splitter 514 that directs a first subportion 504e of beam 504d onto a planar mirror 516. A second subportion 504f of the beam 504d pass through the splitter 514. The first and second subportions 504e and 504f intersect at region 520 forming an optical interference pattern that is unique in both time and space. A photosensitive sheet 558 is disposed in the region 520 so as to be exposed to the optical interference pattern. The interference pattern permeates the photosensitive sheet 558 and modulates the refractive index and charge distribution throughout the volume thereof. The modulation that is induced throughout the volume of the photosensitive sheet 558 is in strict accordance with the modulation properties of the first and second subportions 504e and 504f. Depending upon the photosensitive material employed, the holographic transform function may be set via thermal baking.

Figure 12:
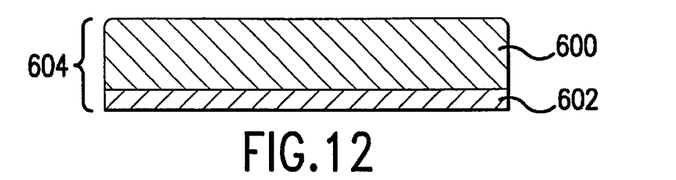
FIG. 12 is a cross-sectional view of a substrate on which the lenses discussed above with respect to FIGS. 4–6 and 8 are fabricated.
Figure 13:
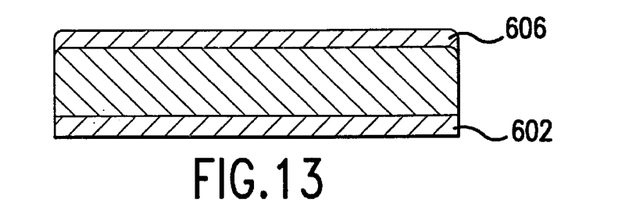
FIG. 13 is a cross-sectional view of the substrate, shown above in FIG. 12, under going processing showing a photoresist layer disposed thereon.

Referring to FIGS. 11 and 12, an arcuate surface is formed in the photosensitive sheet 558 by adhering a photosensitive layer 600 to a sacrificial support 602, such as glass, plastic and the like to form a photosensitive substrate 604. Typically, the photosensitive layer 600 is tens of microns thick. As shown in FIG. 13, a photo resist layer 606 is deposited onto the photosensitive layer 600 and then is patterned to leave predetermined areas exposed, shown as 608 in FIG. 14, defining a patterned substrate 610. Located between the exposed areas 608 are photo resist islands 612. The patterned substrate 610 is exposed to a light source, such as ultraviolet light. This ultraviolet light darkens the volume of the photosensitive layer 600 that is coextensive with the exposed areas 608 being darkened, i.e., become opaque to optical energy. The volume of the photosensitive layer 600 that are coextensive with the photo resist islands 612 are not darkened by the ultraviolet light, i.e., remaining transparent to optical energy. Thereafter, the photo resist islands 612 are removed using standard etch techniques, leaving etched substrate 614, shown in FIG. 15.

Figure 14:
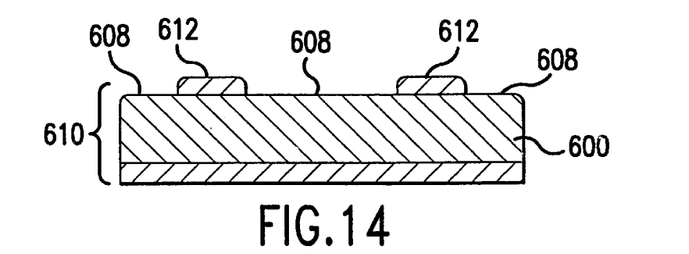
FIG. 14 is a cross-sectional view of the substrate, shown above in FIG. 13, under going processing showing a photoresist layer being patterned.
Figure 15:
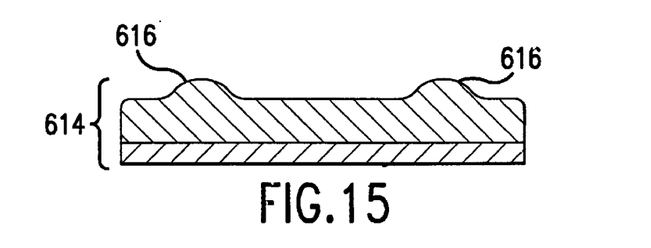
FIG. 15 is cross-sectional view of the substrate, shown above in FIG. 14, under going processing after a first etch step.

The etched substrate 614 has two arcuate regions 616 that are located in areas of the photosensitive layer 600 disposed adjacent to the islands 612, shown in FIG. 14. The arcuate regions 616 of FIG. 15 result from the difference in exposure time to the etch process of the differing regions of the photosensitive layer 600.

Figure 16:
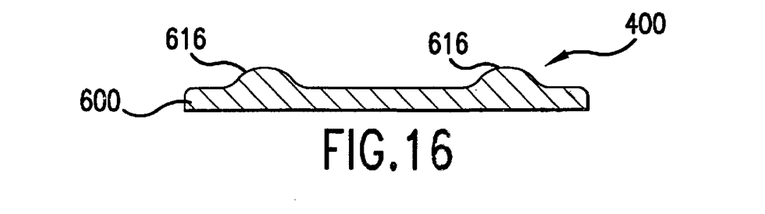
FIG. 16 is a cross-sectional view of the substrate, shown above in FIG. 15, under going processing after a second etch step.

Referring to FIGS. 10 and 16, a subsequent etch process is performed to form array 400. During this etch process the support is removed as well as nearly 50% of the photosensitive layer 600 to form a very thin array. The array 400 is then placed in the system 500, shown in FIG. 11, and the bulk holographic transform functions are recorded in the arcuate regions 616 that define the lenses 458, as discussed above. A Fresnel lens may also be formed on the lenses 458a and 458b of the array 400 using conventional semiconductor techniques. Thereafter, the lenses may be segmented from the photo resistive sheet or M×N subarrays of lenses may be segmented therefrom.

Lenses with differing transform functions are formed on differing photosensitive sheets 558. Specifically, the transform function is defined by the interference pattern formed by the first and second subportions 504e and 504f intersecting at region 520. This interference pattern is unique in both time and space. As a result, each of the lenses formed on the sheet 558 would have substantially identical holographic transform functions. To create lenses with differing transform functions, an additional photosensitive sheet 558 would be employed and, for example, the Faraday rotator 512 may be rotated to provide the lenses formed on the photosensitive sheet 558 with a holographic transform flnction that differs from the holographic transform function associated with the lenses formed on a previous photosensitive sheet 558. Therefore, lenses 458a associated with the first array 458 would come from differing sheets 558 if the lenses were to have differing holographic transform functions.

Although the invention has been described in terms of specific embodiments, one skilled in the art will recognize that various changes to the invention may be performed, and are meant to be included herein. For example, instead of forming the arcuate regions 616, shown in FIG, 15, using standard etch techniques, the same may be formed by exposing the substrate 610, shown in FIG. 14, to thermal energy. In one example, the substrate 610 is convectionally heated, and the photo resist layer 606 is patterned to control the regions of the photosensitive layer 600 that may expand. In another example, the photosensitive layer is heated by conduction employing laser ablation/shaping. Specifically, a laser beam impinges upon areas of the photosensitive layer 600 where lenses are to be formed. The thermal energy from the laser beam causes the photosensitive layer 600 to bubble, forming arcuate regions 616 thereon shown in FIG. 15. Therefore, the scope of the invention should not be based upon the foregoing description. Rather, the scope of the invention should be determined based upon the claims recited herein, including the full scope of equivalents thereof.

What is claimed is:

1. A backplane interconnect system comprising:
    an expansion slot;
    an expansion card in electrical communication with said expansion slot, said expansion card having a source of optical energy to propagate optical energy along an optical path;
    a detector positioned in the optical path; and
    a holographic optical element having an arcuate surface and a holographic transform function, with said optical element being disposed to filter the optical energy in accordance with properties of the holographic transform function to remove optical energy having unwanted characteristics, defining transformed optical energy, and refract the transformed energy in accordance with properties of said arcuate surface to impinge upon said detector.

2. The system as recited in claim 1 further including an additional expansion slot and an additional expansion card in electrical communication with said additional expansion slot, with said detector being mounted to said additional expansion card to facilitate data communication between said expansion cards.

3. The system as recited in claim 1 further including an additional expansion slot and an additional expansion card, in electrical communication with said additional expansion slot, said detector being mounted to said additional expansion card, and said source of-optical energy including an array of optical emitters to generate optical energy to propagate along a plurality of axes and said detector including an array of optical receivers, each of which is positioned to sense optical energy propagating along one of the plurality of optical axes, with said holographic optical element including an array of lenses, each of which is disposed in one of the plurality of axes and includes the arcuate surface with the holographic transform being disposed within a volume of the array of lenses.

4. The system as recited in claim 1 further including an additional expansion slot and an additional expansion card, in electrical communication with said additional expansion slot, with said detector being mounted to said additional expansion card, said source of optical energy including an array of optical emitters to generate optical energy to propagate along a plurality of axes and the detector includes an array of optical receivers, each of which is positioned to sense optical energy propagating along one of the plurality of optical axes, said holographic optical element including a plurality of lenses having the arcuate surface, with said holographic transform function being disposed within a volume thereof, with said plurality of lenses being arranged in first and second arrays, said first array being disposed between said array of optical emitters and said array of optical receivers and said second array being disposed between said first array and the optical receivers.

5. The system as recited in claim 4 wherein the holographic transform function associated with a subgroup of the lenses of the first array differs from the holographic transform function associated with the remaining lenses of the first array of lenses, and the holographic transform function associated with a subset of the lenses of the second array matching the transfer function.

6. The system as recited in claim 1 wherein said source includes semiconductor lasers.

7. The system as recited in claim 1 wherein said detector comprises charge injection devices.

8. The system as recited in claim 1 wherein said holographic optical element further includes a telecentric lens having a bulk hologram recorded therein.

9. The system as recited in claim 1 wherein said holographic optical element further includes a converging lens having a bulk hologram recorded therein.

10. The system as recited in claim 1 further including a processor in data communication with said expansion card slot over a bus with said source producing modulated optical energy in accordance with instructions received from said processor.

11. A backplane interconnect system comprising:
    first and second expansion slots;
    a first expansion card in electrical communication with said first expansion slot, said first expansion card having a first array of optical emitters to generate optical energy to propagate along a plurality of axes and a first array of optical receivers;
    a second expansion card in electrical communication with said second expansion slot, said second expansion card having a second array of optical emitters to generate optical energy to propagate along a plurality of paths, and a second array of optical receivers, each of which is positioned to sense optical energy propagating along one of the plurality of optical axes, with the optical receivers of said first optical array positioned to sense optical energy propagating along said plurality of paths; and
    a holographic optical element including a plurality of lens elements, each of which has a holographic transform function recorded therein, defining a plurality of holographic transform functions, each of said plurality of receivers being associated with one of said plurality of holographic transform functions, with the holographic transform function associated with one of said plurality of receivers differing from the holographic transform functions associated with the remaining detectors of said plurality of detectors.

12. The system as recited in claim 11 wherein each of the optical emitters of said first and second arrays comprises semiconductor lasers.

13. The systems as recited in claim 11 wherein each of the optical receivers of said first and second array comprises charge injection devices.

14. The system as recited in claim 11 wherein a subset of said plurality of lens elements comprise telecentric lenses having a bulk hologram recorded therein.

15. The system as recited in claim 11 wherein a subset of said plurality of lens elements comprise converging lenses having a bulk hologram recorded therein.

16. The system as recited in claim 11 further including a processor in data communication with said first and second expansion card slots over a bus with the optical emitters of said first and second arrays adapted to produce modulated optical energy in accordance with instructions received from said processor.

17. A backplane interconnect system comprising:

first and second expansion slots;

a first expansion card in electrical communication with said first expansion slot, said first expansion card having a first array of optical emitters to generate optical energy to propagate along a plurality of axes and a first array of optical receivers;

a second expansion card in electrical communication with said second expansion slot, said second expansion card having a second array of optical emitters to generate optical energy to propagate along a plurality of paths, and a second array of optical receivers, each of which is positioned to sense optical energy propagating along one of the plurality of optical axes, with the optical receivers of said first optical array positioned to sense optical energy propagating along said plurality of paths, with the optical emitters of said first and second arrays comprising semiconductor lasers and the optical receivers of said first and second array comprising charge injection devices; and a holographic optical element including a plurality of lens elements, each of which has a bulk holographic transform function recorded throughout a volume thereof, defining a plurality of holographic transform functions, each of said plurality of detectors being associated with one of said plurality of holographic transform functions, with the holographic transform function associated with one of said plurality of detectors differing from the holographic transform functions associated with the remaining detector of said plurality of detectors.

18. The system as recited in claim 17 wherein a subset of said plurality of lens elements comprise telecentric lenses.

19. The system as recited in claim 17 wherein a subset of said plurality of lens elements comprise converging lenses.

20. The system as recited in claim 1 further including a processor in data communication with said first and second expansion card slots over a bus with said optical emitters of said first and second arrays adapted to produce modulated optical energy in accordance with instructions received from said processor.

* * * * *